June 11, 1963     J. RYWAK     3,093,756
DETECTOR OF PULSES EXCEEDING A PREDETERMINED LENGTH
Filed Nov. 24, 1961
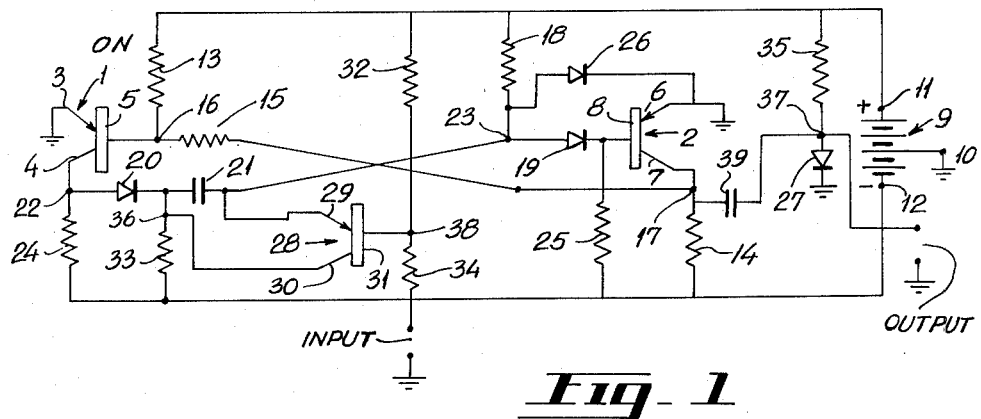
Fig. 1
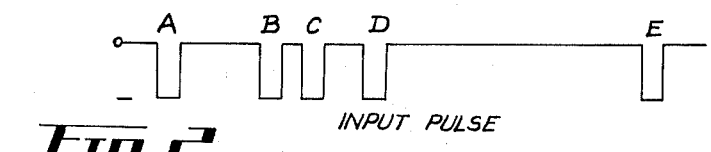
Fig. 2    INPUT PULSE
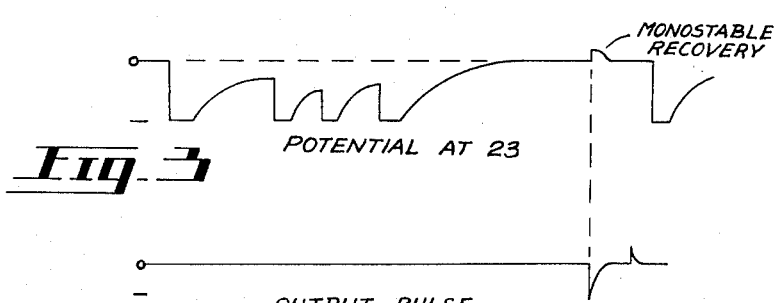
Fig. 3    POTENTIAL AT 23
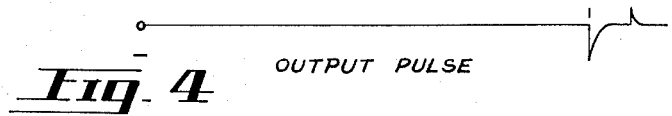
Fig. 4    OUTPUT PULSE
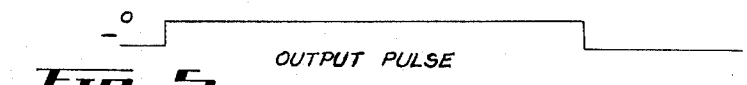
Fig. 5    OUTPUT PULSE
Inventor
JOHN RYWAK
Attorney

United States Patent Office 3,093,756
Patented June 11, 1963

3,093,756
DETECTOR OF PULSES EXCEEDING A PREDETERMINED LENGTH
John Rywak, Bells Corners, Ontario, Canada, assignor to Northern Electric Company, Limited, Montreal, Quebec, Canada, a corporation of Canada
Filed Nov. 24, 1961, Ser. No. 154,679
4 Claims. (Cl. 307—88.5)

This invention relates to transistor detecting circuit and more particularly to such circuits for detecting pulses which exceed a predetermined length.

In pulse transmission systems, there may be a requirement for observing or detecting a signal potential exceeding a pulse of predetermined length for use with circuits such as those relating to alarm circuits.

An object of this invention is to provide a multivibrator circuit employing transistors in which any pulse exceeding a predetermined length is detected.

These objects are attained by providing a monostable transistor circuit as disclosed in my co-pending application Serial No. 68,182, filed November 9, 1960, and incorporating in one of the coupling arms a transistor timing circuit to control the triggering of the monostable circuit.

A better understanding may be attained by referring to the following description, taken in combination with the drawings in which:

FIG. 1 illustrates a circuit schematic diagram of a multivibrator circuit in which the invention is incorporated;

FIGS. 2 and 3 illustrate graphs of the wave form of the input and output pulse respectively;

FIG. 4 illustrates the rise and fall of the potential in the timing circuit during the timing interval; and FIG. 5 illustrates the D.C. wave form level obtained by this circuit of the invention.

Considering the drawings, there is shown a first and second p-n-p transistor 1 and 2; each having an emitter, collector and base electrodes 3, 4, 5 and 6, 7, 8 respectively, a source of potential 9, grounded at the point 10, having terminals 11, 12 connected to the positive and negative sources respectively.

Also shown is a first resistor 13 connected to the terminal 11 of the source 9 and to the base electrode 5 of the transistor 1, a second resistor 14 connected to the terminal 12, of the source 9 and to the collector 7 of the transistor 2 and a third resistor 15 connected between the resistors 13, 14 so as to form the points of reference potentials 16, 17.

In addition there is shown a fourth resistor 18 connected to the terminal 11 of the source 9 and to the base electrode 8 of transistor 2 through diode 19, diode 20 and capacitor 21, in series relation, the anode of diode 20 being connected to the collector electrode 4 of transistor 1 to form the point of reference potential 22 and the capacitor 21 to the anode electrode of diode 19. The point of reference potential 23 is determined by the current flowing from terminal 11 of source 9, through resistor 18 and diode 26 to ground 10.

The resistor 15 and the diode 20, capacitor 21 are the coupling arms for transistors 1 and 2 to form the multivibrator action of the circuit. The fifth and sixth resistors 24 and 25 are the collector and base biasing resistors for the collector electrode 4 and the base electrode 8 of the transistors 1 and 2 respectively. The anode of diode 27 is connected to the terminal 11 of the source 9 through resistor 35 and capacitor 39 while its cathode is connected to ground.

Also shown is third transistor 28 having emitter, collector and base electrodes 29, 30, 31, the emitter electrode being connected to the point of reference potential 23 and its collector electrode connected to the point of reference potential 36. Resistors 32, 33, 34 are the biasing resistors for the transistor 28. Resistor 35 in series relation with diode 27 provides point of reference potential 37 at the junction thereof. The potential at the point of reference 38, at the junction of resistors 32, 34 provides a source of bias for transistor 28. Capacitor 39 between points of reference potential 17 and 37 provides the shaping network for the output wave form.

Representative values of the resistors and the capacitors employed in the circuit are:

Resistors:
13 _____ 22K
14 _____ 4.7K
15 _____ 6.8K
18 _____ 56K
24 _____ 68K
25 _____ 68K
32 _____ 68K
33 _____ 8.2K
34 _____ 1.2K
35 _____ 22K Capacitors:
21 _____mf__ .25
39 _____mf__ .01

The following is the operation of the circuits.

Standby Condition

In this condition, the circuit 11—13—16—15—17—14—12 is completed so that the point of reference potential 16 is negative with respect to ground allowing a forward bias to be applied to the base electrode 5 of transistor 1 which conducts. When transistor 1 conducts the potential at the reference point 22 is slightly below ground.

The circuit 11—18—23—19—25—12, which is the biasing circuit for transistor 2, is completed and diode 19 is conducting. Because resistor 18 is smaller in resistive value than resistor 25 transistor 2 is non-conducting at this stage of the operation.

Likewise the circuit 11—32—38—34—ground—10—11 which is biasing circuit for transistor 28 is not completed until a negative going pulse is applied to the input of the circuit. Diode 20 is conducting and resistor 33 is in effect in parallel with resistor 24.

Triggered Condition

When a negative going input pulse A is applied the circuit, ground—34—38—32—11—10—ground, is completed so that the point of reference potential 38 is negative with respect to the point of reference potential 23. Transistor 28 therefore conducts. When transistor 28 saturates the negative going input pulse @ (FIG. 2) causes the potential at the point of reference potential 23 to fall below ground causing diodes 19 and 26 to become back-biased permitting transistor 2 to become conducting because of the base current flowing through resistor 25. When transistor 2 conducts the point of reference potential 17 rises to ground so that point of reference potential 16 rises slightly above ground causing transistor 1 to be non-conducting. The multivibrator circuit is therefore triggered.

Operate Condition

When the negative going input pulse A is removed transistor 28 becomes non-conducting. Following the removal of pulse A point of reference potential 23 rises towards ground as shown in FIG. 4. Before point of reference potential 23 reaches ground, a second negative ground pulse B (FIG. 2) causes capacitor 21 to discharge through transistor 28 so that the potential at the point of reference potential 23 begins again to rise towards ground. This charge-discharge cycle is repeated as long as a subsequent pulse arrives before the potential at the point of reference potential 23 reaches ground. In FIG. 2 it may be seen that the interval between pulses D and E is longer than the natural operate period of the mono-stable circuit since the potential at the point of reference potential 23 reaches ground potential before the arrival of pulse E transistor 2 is cutoff and transistor 1 turned on. The circuit has now recovered through mono-stable type action and, through network 39, 35, 27, allows an output signal at the point of reference potentials at reference 37 to be emitter. This signal may be used to trigger an alarm circuit.

Diode 26 provides a low impedance discharge path for capacitor 21 immediately after the above mentioned recovery action.

If a D.C. level were required as an output as shown in FIG. 5, the output may be taken from point of reference potential 17 and capacitor 39, resistor 35 and diode 27 omitted.

What is claimed is:

1. A circuit for detecting pulses exceeding a predetermined length comprising in combination: a first and second semi-conductor device each having a base, emitter and collector electrode; a source of potential; a first resistor connected to a first terminal of the source, poled to apply a predetermined polarity thereto, and to the base electrode of the first device, a second resistor connected to the other terminal of the potential source and to the collector electrode of the second device, a third resistor connected between the first and second resistor, a fourth resistor connected to the first terminal of the potential source and to the anode of a first diode, means for connecting the cathode of the diode to the base electrode of the second device, a fifth resistor connected to the other terminal of the potential source and to the collector electrode of the first device, a capacitor and a second diode, is series relation, connected between the fourth resistor and the collector electrode of the first device, a third transistor having its emitter and collector electrodes connected across the capacitor, a sixth and seventh resistor in series relation, connected across the potential source, the junction thereof being connected to the base electrode of the third device, an eighth resistor connected between junction of the second diode and the capacitor and the other terminal of the potential source, means for grounding the emitter electrode of the first and second device.

2. A circuit as defined in claim 1 having in combination therewith a third diode having an anode connected to the anode of the first diode and the cathode to the emitter electrode of the second device.

3. A circuit as defined in claim 1 having in combination therewith a resistor and capacitor, connected in series relation to form a junction point, connected between the collector electrode of the second device and the first terminal of the potential source, a fourth diode having the anode connected to the junction point and the cathode to ground potential.

4. A circuit as defined in claim 2 having in combination therewith a resistor and capacitor connected in series relation to form a junction point, connected between the collector electrode of the second device and the first terminal of the potential source, a fourth diode having the anode connected to the junction point and the cathode to ground potential.

References Cited in the file of this patent
UNITED STATES PATENTS

| | | |
|---|---|---|
| 3,005,963 | Emile | Oct. 24, 1961 |
| 3,059,128 | Cramer | Oct. 16, 1962 |
| 3,060,331 | Habisohn | Oct. 23, 1962 |
| 3,061,800 | Matzen | Oct. 30, 1962 |
| 3,065,362 | Benson | Nov. 20, 1962 |